United States Patent [19]

Okada

[11] Patent Number: 5,563,480
[45] Date of Patent: Oct. 8, 1996

[54] LOAD AND SUPPLY VOLTAGE SENSITIVE SPEED CONTROL SYSTEM FOR DC BRUSHLESS FAN MOTORS

[75] Inventor: Yasuhiro Okada, Tottori, Japan

[73] Assignee: Matsushita Electric Industrial Co., Ltd., Osaka, Japan

[21] Appl. No.: 391,273

[22] Filed: Feb. 21, 1995

Related U.S. Application Data

[63] Continuation of Ser. No. 64,336, May 19, 1993, abandoned, which is a continuation of Ser. No. 843,617, Feb. 28, 1992, abandoned.

[30] Foreign Application Priority Data

Apr. 1, 1991 [JP] Japan ........................... 3-68248

[51] Int. Cl.$^6$ ........................................ H02P 7/00
[52] U.S. Cl. ................... 318/254; 318/439; 388/815
[58] Field of Search ........................ 318/254, 138, 318/439, 471, 473; 388/815, 827, 822, 803

[56] References Cited

U.S. PATENT DOCUMENTS

| | | | |
|---|---|---|---|
| 2,898,533 | 8/1959 | Beckett | 318/254 |
| 3,777,234 | 12/1973 | Luger | 388/934 X |
| 3,986,086 | 10/1976 | Muller | 318/138 |
| 4,070,606 | 1/1978 | Morozumi et al. | 318/254 |
| 4,227,127 | 10/1980 | Fukaya et al. | 318/459 X |
| 4,234,835 | 11/1980 | Ota et al. | 388/815 |
| 4,345,189 | 8/1982 | Kukaya et al. | 388/815 |
| 4,450,392 | 5/1984 | Gaslonde | 388/827 |
| 4,477,752 | 10/1984 | Nakano et al. | 388/827 |
| 4,626,753 | 12/1986 | Letterman | 318/471 X |
| 4,722,669 | 2/1988 | Kundert | 388/815 |
| 4,742,281 | 5/1988 | Nakano et al. | 388/815 |
| 4,806,832 | 2/1989 | Muller | 388/833 |
| 4,831,312 | 5/1989 | Okazaki et al. | 388/815 |
| 4,856,078 | 8/1989 | Konopka | 388/934 X |
| 4,879,497 | 11/1989 | Meyer et al. | 318/254 |
| 4,949,393 | 8/1990 | Ohmori et al. | 388/815 |
| 4,955,431 | 9/1990 | Saur et al. | 388/822 X |
| 5,041,335 | 5/1991 | Anton | 388/815 |
| 5,043,642 | 8/1991 | Ohi | 318/254 |

*Primary Examiner*—Jonathan Wysocki
*Attorney, Agent, or Firm*—Amster, Rothstein & Ebenstein

[57] ABSTRACT

A speed control system for brushless DC motors which maintains the rotational speed of the motor substantially constant even when the motor load and/or supply voltage fluctuates. Furthermore, by including a negative-resistance temperature coefficient thermistor in the speed control system, the rotational speed of the brushless DC motor may be varied as a function of ambient temperature. Thus, if the brushless DC motor is part of a motor fan and there is an increase in the ambient temperature, the rotational speed of the motor will increase to provide additional cooling. In contrast, if the ambient temperature decreases, the rotational speed of the brushless DC motor will be reduced thereby resulting in quieter operation of the motor.

3 Claims, 3 Drawing Sheets

LOAD AND SUPPLY VOLTAGE SENSITIVE SPEED CONTROL SYSTEM FOR DC BRUSHLESS FAN MOTORS

This is a continuation of application Ser. No. 08/064,336, filed on May 19, 1993, now abandoned, which was a continuation of application Ser. No. 07/843,617, filed Feb. 28, 1992, and now abandoned.

FIELD OF THE INVENTION

This invention relates generally to a speed control system for DC brushless motors, and more particularly, to a speed control system which is less complicated and less expensive than speed control systems incorporating frequency generators.

BACKGROUND OF THE INVENTION

DC Brushless motors are utilized in various kinds of consumer equipment and industrial equipment because of their high reliability, which is in part due to the absence in such motors of commutation brushes and rectifiers. DC brushless motors are found, for example, in small cooling fans which have low noise levels, long life and high reliability characteristics even at high speed operation.

In the past, the most common method for controlling the speed of a DC brushless fan was a speed control system which uses a frequency generator. However, these speed control systems are complicated and expensive because the use of a frequency generator requires special circuitry for detecting frequency generator signals, including high gain amplifying circuitry for amplifying the usually weak frequency generator signals. In addition, the frequency generator itself is expensive since it requires a rotor magnet having multiple magnetic poles. Thus, while DC brushless motors are themselves relatively inexpensive, systems for controlling the speed of such motors could often not be justified because of their expense.

In certain applications utilizing DC brushless motors, speed control is not a critical requirement. However, with the growing use of DC brushless motors in more and more equipment, there has developed a need for an inexpensive speed control system.

Further, in equipment such as computers and photocopying machines, the noise from a DC brushless fan motor can be annoying since such equipment is usually found in a quiet office environment. One solution to this noise problem is controlling fan motor speed relative to temperature. That is to say, if the ambient air temperature within the equipment increases so will the speed of the motor fan. However, with a reduction in temperature, there is no need for high speed operation and the fan's motor speed and corresponding noise level is reduced. Noise due to fan motor speed could also be eliminated or reduced by varying motor speed in steps as a function of the equipment's operating mode.

An objective of the present invention to provide an uncomplicated and relatively inexpensive speed control system for DC brushless fan motors that achieves beneficial speed control without the use of a frequency generator.

A further objective of the speed control system of the present invention is to maintain the speed of a DC brushless motor substantially constant even though the motor may be subjected to variations in load and/or variation in supply voltage.

Still another objective of the present invention is to provide a speed control system which varies the rotational speed of a DC brushless motor as a function of ambient air temperature. Thus, if the DC brushless motor is utilized as a fan motor, the rotational speed of the motor will increase if the ambient air temperature increases, but will decrease when there is a decrease in temperature.

These objectives, together with other advantages which will become subsequently apparent, reside in the details of construction and operation of a speed control system more fully described and claimed hereinafter, with reference to the accompanying drawings forming a part thereof.

BRIEF DESCRIPTION OF THE INVENTION

According to the present invention, a speed control system is provided for controlling the rotational speed of a rotor of a DC brushless motor. In accordance with one aspect of the speed control system, the rotational speed of the rotor is maintained substantially constant even when there is a variation in the load and/or variation in supply voltage applied to the motor. In another aspect of the speed control system, the rotational speed of the motor is increased to provide additional cooling air flow when there is an increase in ambient temperature and the rotational speed of the motor is correspondingly decreased when there is a decrease in ambient temperature.

The speed control system includes a voltage control means that is coupled to the output of the stator coils of the motor and includes circuitry that provides a feedback signal responsive to a change in the load on the motor. If the motor is subjected to a variation in load and/or variation in supply voltage, the rotational speed of the rotor will likewise vary and manifest itself as a change in the induced electromotive force (EMF) developed across the stator coil. In the speed control system of the present invention, the feedback signal will change as a result of the change in the induced electromotive force across the stator coils. The feedback signal will cause the voltage control means to adjust the current in the stator coils and thereby maintain the rotational speed of the motor substantially constant even though the motor has been subjected to a variation in load and/or variation in supply voltage.

In one embodiment of the present invention the voltage control means includes an operational amplifier and circuitry connected thereto which will vary the current applied to the stator coils when there is a fluctuation in the load and/or variation in supply voltage to which the motor is subjected.

In another aspect of the speed control system of the present invention, the voltage control means further includes a resistance means whose resistance is inversely proportional to the ambient temperature. The resistance means may be a negative-resistance temperature coefficient thermistor. If the resistance means is a thermistor, any increase in the ambient temperature surrounding the thermistor will cause a proportionate increase in the rotational speed of the motor, and conversely any decrease in the ambient temperature surrounding the thermistor will cause a decrease in the rotational speed of the motor. Thus, when there is an increase in ambient temperature, a fan connected to the motor will increase its flow of cooling air, but in the converse situation when there is less need for a cooling effect, the rotational speed of the motor will decrease, thereby providing a more cost effective and quieter motor fan.

DESCRIPTION OF THE PREFERRED EMBODIMENTS

Figure 1:
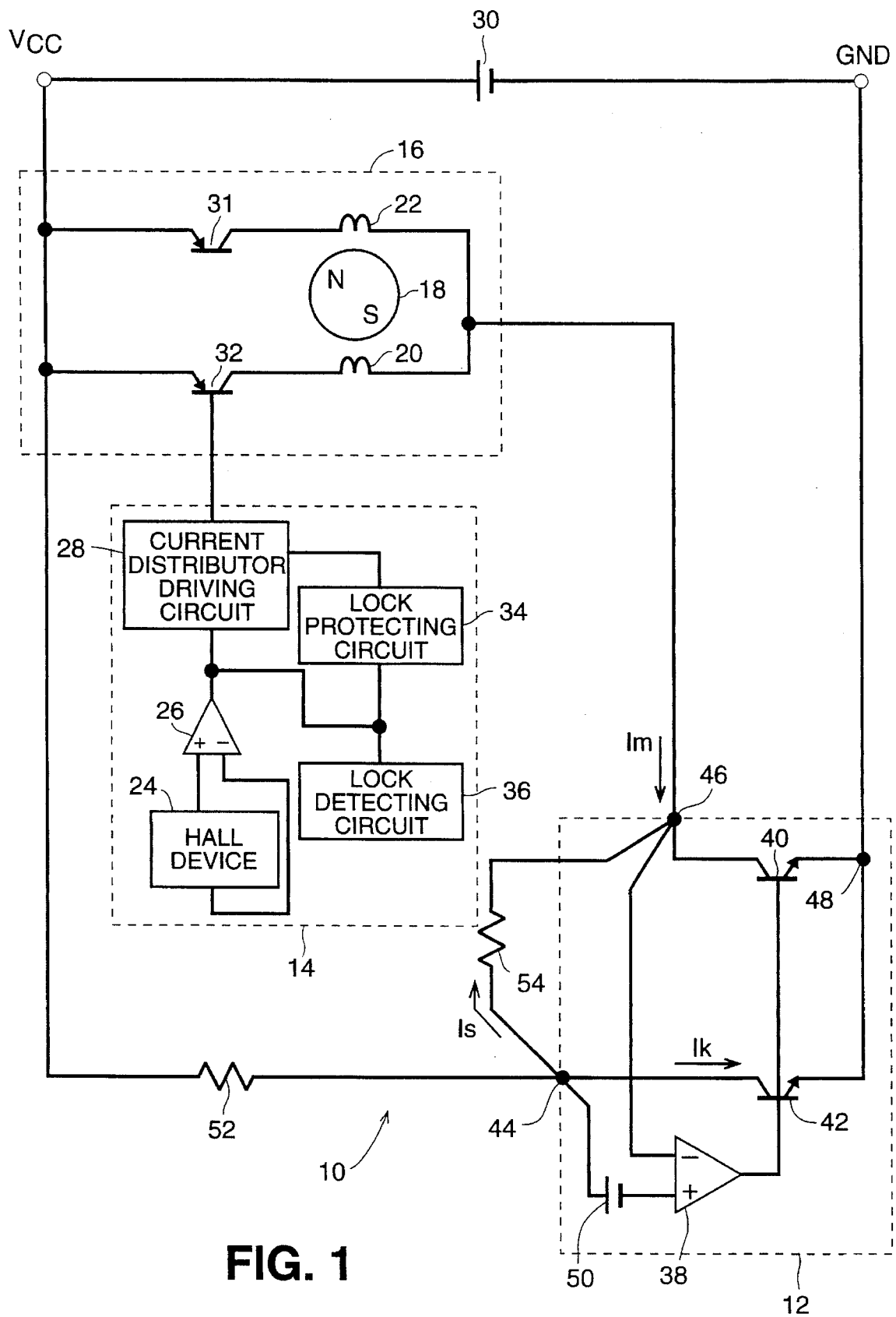
FIG. 1 is a schematic diagram of a first embodiment of a speed control system of the present invention for operating

In the description which follows like parts are marked throughout the specification and drawings with the same reference numeral.

Referring to FIG. 1, a first embodiment of the speed control system of the present invention is designated by the numeral 10. The speed control system 10 comprises a voltage regulator 12 and a driving circuit 14. DC brushless motor 16 generally has a rotor magnet 18 with 2n magnetic poles, where n is an integer, and first and second stator coils 20 and 22.

Driving circuit 14 comprises a Hall device 24 which is positioned in close proximity to rotor 18 for detecting the magnetic flux emitted from the magnetic poles of rotor 18. Hall device 24 generates an electrical signal which varies according to the polarity of the magnetic flux admitted by the magnetic poles of rotor 18. Thus, the output signal from Hall device 24 will differ when it detects magnetic flux from a rotor pole of north polarity than when it detects magnetic flux from a rotor pole of south polarity.

The output signal from Hall device 24 is amplified by amplifier 26 and is then transmitted to current distribution circuit 28 which controls the application of current from a power source 30 to either the first stator coil 20 or the second stator coil 22 by activating either a first driving transistor 31 or a second driving transistor 32. More specifically, if Hall device 24 senses magnetic flux of one polarity its output signal will cause current distribution circuit 28 to bias the first driving transistor 31 to its conducting state thereby resulting in current transmission from power source 30 to stator coil 22 via first driving transistor 31. In a like manner, if Hall device 24 senses magnetic flux of an opposite polarity, current distribution circuit 28 causes the second driving transistor 32 to switch to its conducting state resulting in a current flow from power source 30 to stator coil 20 via second driving transistor 32. Driving circuit 14 also includes a conventional lock protecting circuit 34 which is in series with a conventional lock detecting circuit 36.

Voltage regulator 12 comprises amplifier 38, first and second output transistors 40 and 42, first connecting point 46, second connecting point 44, ground terminal 48 and reference voltage 50. Reference voltage 50 determines the motor speed, which is supplied adequately by well known means not shown here. The output of both first and second stator coils 20 and 22 is connected to the first connecting point 46, and power source 30 is connected to the second connecting point 44 through a first resistor 52 having a resistance $R_r$. A second resistor 54, having a resistance $R_s$, is connected between first connecting point 46 and second connecting point 44.

Amplifier 38 has a positive input terminal connected to second connecting point 44 through reference voltage 50, and a negative input terminal connected to the first connecting point 46. The output of amplifier 38 is connected to the base of both first and second output transistors 40 and 42, while the emitters of both transistors 40 and 42 are connected to ground via terminal 48. Further, the collector of first output transistor 40 is connected to the first connecting point 46, and the collector of second output transistor 42 is connected to the second connecting point 44. First and second output transistors 40 and 42 are arranged in parallel in what is commonly known as a current mirror configuration. As a result of this configuration, the collector current $I_k$ flowing through the second output transistor 42 is equal to a fixed proportion, e.g., 1/k, of the motor driving current $I_m$ which flows into first connecting point 46 from stator coils 20 and 22. Further as a result of this mirror current configuration, the voltage potential across first connecting point 46 and second connecting point 44 will be equal to the voltage $V_{ref}$ of reference voltage 50.

In the operation of speed control system 10, Hall device 24 of driving circuit 14 senses the magnetic flux from rotor magnet 18 and generates an appropriate signal which is amplified by amplifier 26. The amplified signal is received by current distribution circuit 28, and depending on the particular signal received, current distribution circuit 28 causes current to flow either through first stator coil 20 or second stator coil 22 by biasing either first or second driving transistor 31 or 32 into its conducting state.

If motor 16 is subjected to a variation in its load and/or variation in supply voltage, the rotational speed of rotor 18 will likewise vary. This fluctuation in rotational speed will manifest itself as a change in the electromotive force induced across the stator coil through which a current is flowing, which will produce a change in the voltage at first connecting point 46. The change in voltage at first connecting point 46 will be detected by amplifier 38, which is an operational amplifier having a negative input and a positive input, and configured with a negative feedback loop including first and second output transistors 40 and 42. Since the operational amplifier tends to stabilize and equalize the signals at its positive and negative voltage input terminals the change in the voltage difference between power source 30 and the negative input terminal of the operational amplifier (FIG. 1) will produce a momentary imbalance between the signals at the positive and negative terminals of operational amplifier 38 and result in a change in the voltage signal output from operational amplifier 38. The operational bias of the first and second output transistors 40 and 42 will thereby change, which in turn will change the output current $I_m$ of the stator coil to correct the imbalance. This change in output current $I_m$ likewise restores the electromotive force across the stator coil to its original value with the consequence that the rotational speed of the motor will be substantially returned to its rotational speed prior to being subjected to a fluctuation in load.

Thus, for example, if an increase in load torque on rotor 18 results in a decrease in the rotor's rotational speed, the induced voltage across the stator coil is decreased thereby resulting in a voltage increase at first connecting point 46. Because first connecting point 46 is connected to the inverted terminal of operational amplifier 38, there is an increase in the output voltage of operational amplifier 38. With the increased output voltage of operational amplifier 38, the base voltage at transistors 40 and 42 increases which in turn increases the output current $I_m$ and thus the rotational speed of rotor 18. Thus, because the speed control system 10 has a high gain, it maintains the rotational speed of the motor substantially constant even when the motor is subjected to a variation in load and/or in supply voltage and independent of output current $I_m$. These characteristics of speed control system 10 are further analyzed in the following discussion.

When current is flowing through either one or the other of the stator coils 20 or 22, the voltage difference $V_o$ between the positive terminal of power source 30 and second first connecting point 46 of voltage regulator 12 is expressed by the following equation:

$$V_o = E_{emf} + I_m R_m + V_{sat}. \tag{1}$$

where $E_{emf}$ is the electromotive force or induced voltage produced in the stator coil through which current flows, $R_m$ is the resistance of that stator coil, $I_m$ is the current flowing from that stator coil to first connecting point 46, and $V_{sat}$ is the saturation voltage of the driving transistor 31, 32 which is conducting. Since the saturation voltage $V_{sat}$ is negligible, it may be ignored in Equation 1, which would now read as:

$$V_o = E_{emf} + (I_m R_m). \tag{2}$$

From the following discussion concerning speed control system 10 and the accompanying equations, it will become apparent that by selecting first resistor 52 at an appropriate value, the rotational speed of rotor 18 will remain substantially constant even if there is a variation in the motor's load and/or variation in supply voltage. Furthermore, if second resistor 54 is a thermistor, the rotational speed of rotor 18 will be a function of the ambient temperature to which second resistor 54 is subjected. Thus, if motor 16 is operating at a high temperature, rotor speed will increase and thereby increase its cooling effect. In contrast, if the ambient temperature decreases, there will be a proportional reduction in the speed of rotor 18.

In the situation where the speed of rotor 18 changes, the induced voltage $E_{emf}$ of the stator coil will likewise change, as will voltage differential $V_o$ in accordance with Equation 2. Since amplifier 38 is operated with a negative feedback loop consisting of based-coupled first and second output transistor 40 and 42 connected between the output and negative input of amplifier 38, this change in the induced voltage, $E_{emf}$, is compared to the voltage $V_{ref}$ of reference voltage 50 by the amplifier 38. The resulting output signal of amplifier 38, through first and second output transistors 40 and 42, adjusts the output current $I_m$ of the stator coil in order to maintain the rotational speed of motor 18 constant even though there has been a change in the load and/or change in the supply voltage applied to motor 16. This characteristic of the speed control system 10 can further be explained mathematically.

The current flowing into the collector of second output transistor 42 is designated as $I_k$, and the current flowing through second resistor 54 is designated as $I_s$. Because of the current mirror configuration of voltage regulator 12, current $I_k$ is equal to a proportion, designated as $1/K$, of current $I_m$, which is the output current from the stator coil flowing into first connecting point 46. Thus, $$I_k = I_m/K. \tag{3}$$

Since an operational amplifier such as amplifier 38 tends to stabilize and equalize the signals at its input terminals:

$$V_{ref} = I_s R_s \text{ or } I_s = V_{ref}/R_s. \tag{4}$$

The voltage differential $V_{in}$ between the positive terminal of power source 30 and the positive input of amplifier 38 is equal to the voltage across first resistor 52 ($R_t$) plus voltage $V_{ref}$ of reference voltage 50. In the form of an equation, voltage $V_{in}$ would be designated as follows:

$$V_{in} = V_{ref} + (I_k + I_s) R_t. \tag{5}$$

If Equations (3) and (4) are substituted into Equation (5), the result is as follows:

$$V_{in} = V_{ref}(1 + R_t/R_s) + I_m R_t/K. \tag{7}$$

The voltage differential $V_o$ between the positive terminal of power source 30 and the negative input of amplifier 38 has been previously shown in Equation (2). Since the negative feedback loop of amplifier 38 adjusts the voltage $V_o$ at the negative input of amplifier 38 so that it is equal to voltage $V_{in}$ at the positive input of amplifier 38, it follows that $$V_o = V_{in}. \tag{7}$$

If Equations (2) and (6) are substituted into Equation (7) the result is as follows:

$$E_{emf} + I_m R_m = V_{ref}(1 + R_t/R_s) + I_m R_t/K. \tag{8}$$

If Equation (8) is solved for the induced voltage $E_{emf}$, the result is:

$$E_{emf} = V_{ref}(1 + R_t/R_s) - (R_m - R_t/K)(I_m). \tag{9}$$

If the resistance $R_t$ of first resistor 52 is selected to be equal to the proportionality constant K multiplied by the resistance $R_m$ of the stator coil, that is, $$R_t = K R_m, \tag{10}$$

Equation 9 is simplified as:

$$E_{emf} = V_{ref}(1 + R_t/R_s). \tag{11}$$

Thus, the induced voltage $E_{emf}$ across the stator coil will be constant since it is determined by reference voltage $V_{ref}$ and resistances $R_t$ and $R_s$ which are themselves of fixed values.

Likewise, the rotational speed N of motor 16 will also be a constant. As is known from the basic laws of physics, the voltage $E_{emf}$ that is induced across the stator coil is equal to a power generation constant, $K_a$, times the rotational speed N of the motor 16. In the form of an equation this is:

$$E_{emf} = K_a(N). \tag{12}$$

If Equation (12) is solved for rotational speed N, and Equation (11) is substituted therein, the result is:

$$N = V_{ref}(1 + R_t/R_s)/K_a. \tag{13}$$

Thus, according to Equation (13), the speed of rotation N of motor 16 will be constant despite fluctuations in load torque and/or fluctuations in supply voltage since rotational speed N is a function of the constants $V_{ref}$, $R_t$, $R_s$ and $K_a$.

According to Equation (13), the resistance $R_s$ of second resistor 54 is inversely proportional to the rotational speed of motor 16. Therefore, if second resistor 54 were replaced by a thermistor having a negative-resistance temperature coefficient, the rotational speed of motor 16 would be a function of the ambient temperature surrounding the thermistor. If the ambient temperature surrounding the thermistor increased, the rotational speed of fan motor 16 would increase to provide an increased cooling effect to counter the rise in temperature. If instead the ambient temperature of the thermistor were reduced, the rotational speed of the motor would likewise be reduced since there would be no need for it providing any additional cooling thereby providing quieter operation.

Figure 2:
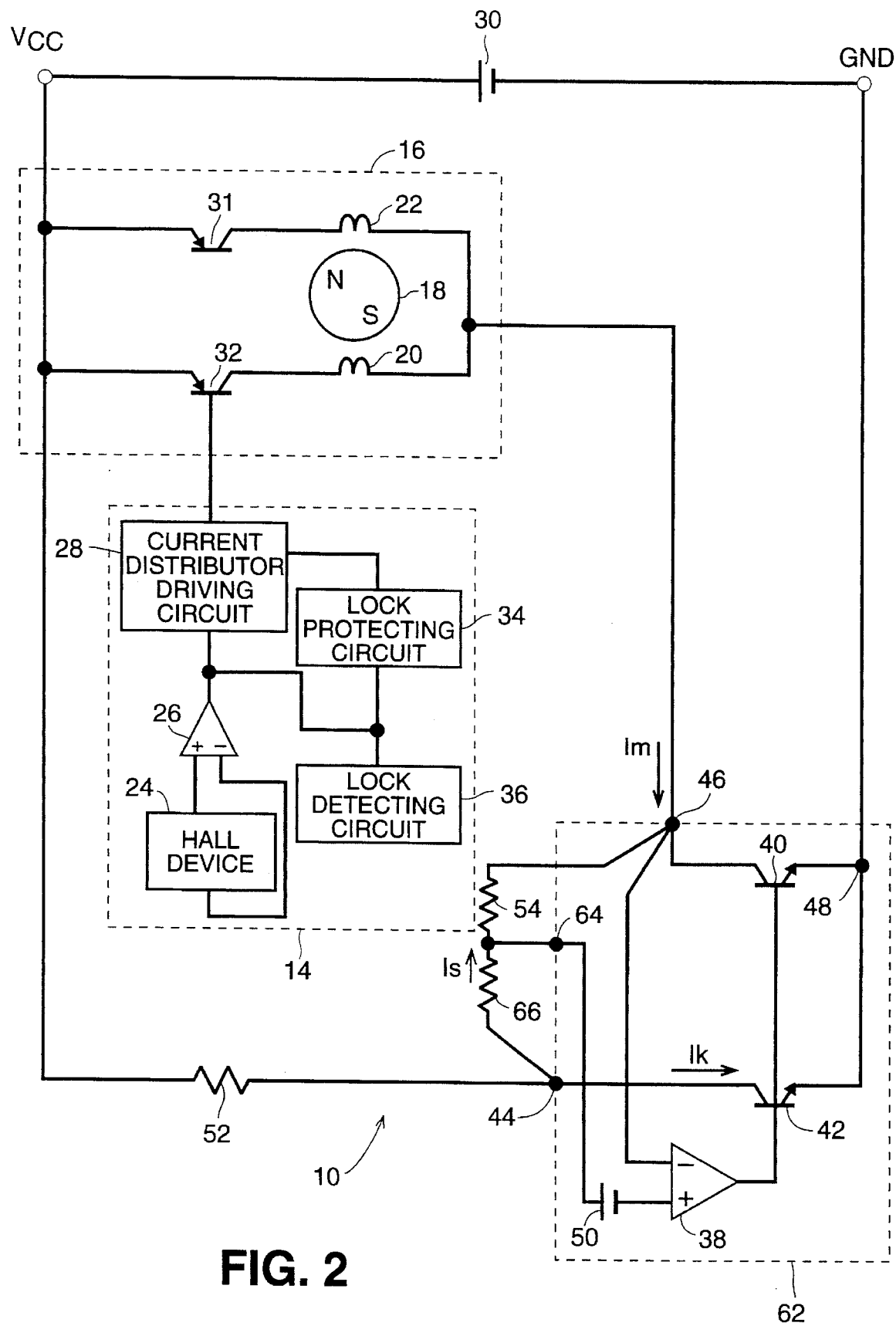
FIG. 2 is a schematic diagram of a second embodiment of the speed control system of the present invention.

Referring to FIG. 2, a second embodiment of a speed control system is designated by reference number 60. Speed control system 60 is similar to speed control 10 (FIG. 1), except for the configuration of voltage regulator 62. Like reference numerals designate components common to both embodiments. Like voltage regulator 12 of speed control 10, voltage regulator 62 includes an amplifier 38 and first and second output transistors 40 and 42, respectively. Similarly, the current flowing to second connecting point 44 is proportional to current $I_m$ flowing to first connecting point 46 from the stator coil. Voltage regulator 62 differs from voltage regulator 12 in that it includes an input terminal 64 and a third resistor 66 connected between second connecting point 44 and input terminal 64. The resistance of second resistor 54 is designated as $R_{s2}$ and the resistance of third resistor 66 is designated as $R_{s3}$.

With respect to speed control system 60, the voltage differential $V_{in}$ between the positive terminal of power source 30 and the positive terminal of amplifier 38 is as follows:

$$V_{in} = V_{ref} + (I_k + I_s R_t + I_s R_{s3}) \quad (14)$$
$$= V_{ref}(1 + R_t/R_{s2} + R_{s3}/R_{s2}) + I_m R_t/K.$$

Since all of the parameters on the right hand side of the equal sign of Equation (14) are constant except for the current $I_m$, it is apparent that the voltage potential $V_{in}$ will vary in proportion to current $I_m$.

Deriving an equation for the rotational speed N of motor 16 operated by speed control system 60 is accomplished in a similar fashion as was done with respect to speed control system 10, and is as follows:

$$N = V_{ref}(1 + R_t/R_{s2} + R_{s3}/R_{s2})/K_a. \quad (15)$$

Thus, the rotational speed N of motor 16 operated by speed control system 60 is inversely proportional to resistance $R_{s2}$ of second resistor 54. Moreover, if a negative-resistance temperature coefficient thermistor replaces second resistor 54, the rotational speed of motor 16 is a function of the ambient temperature surrounding the thermistor.

Figure 3:
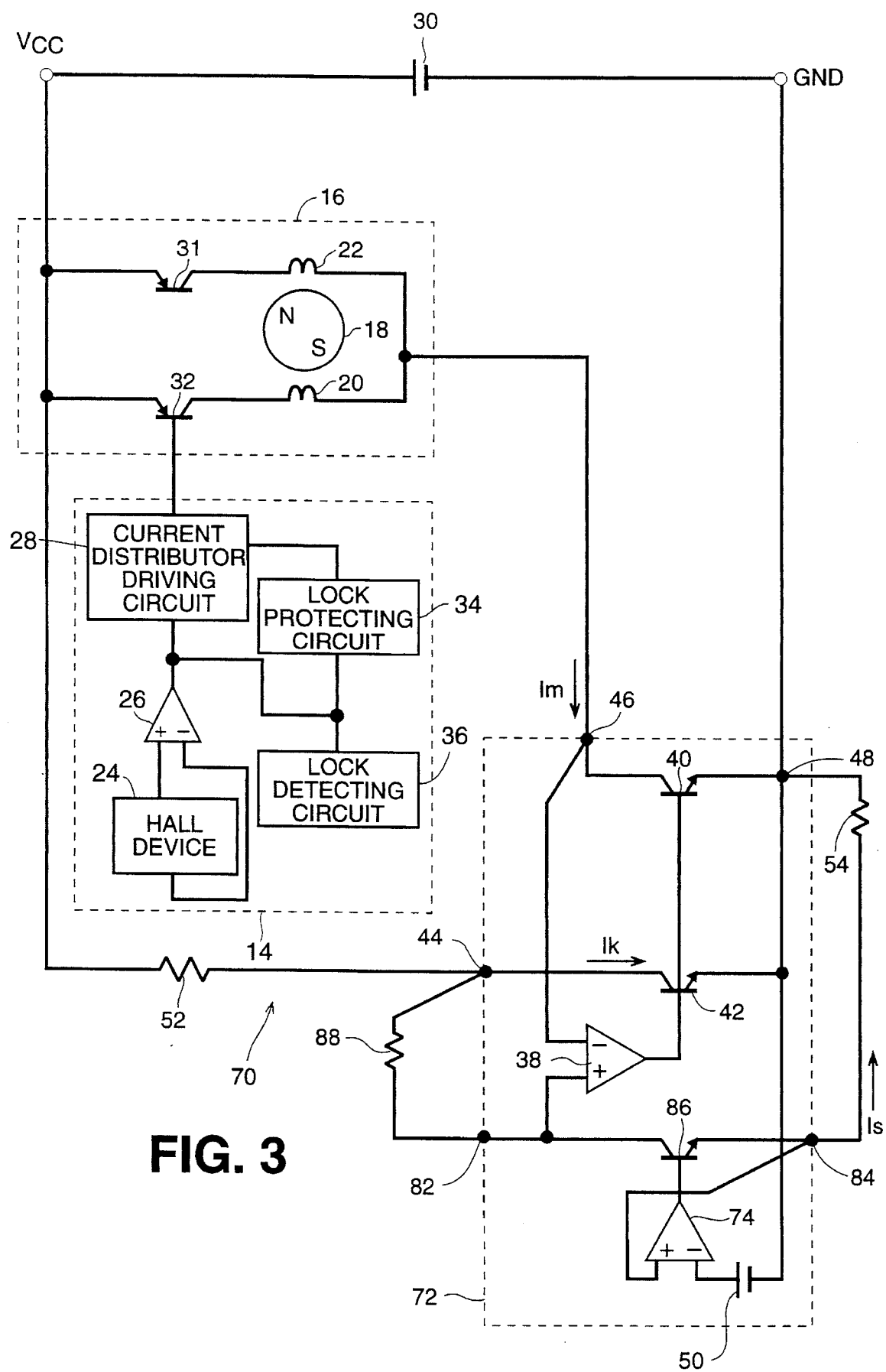
FIG. 3 is a schematic diagram of a third embodiment of a speed control system of the present invention.

Referring to FIG. 3, a third embodiment of the speed control system is designated as 70. Here again, like reference numerals designate components common to the other embodiments of the invention. Speed control system 70 is similar to speed control system 10 except for the circuit configuration of voltage regulator 72. Voltage regulator 72 comprises first amplifier 38, second amplifier 74, second connecting point 44, first connecting point 46, and output terminals 82 and 84. As in voltage regulator 12 (FIG. 1) and voltage regulator 62 (FIG. 2), the output signal from amplifier 38 in voltage regulator 72 is connected to the base of first and second output transistors 40 and 42, and the emitter of first and second output transistors 40 and 42 are connected to ground through terminal 48. In other respects, however, the circuit configuration of voltage regulator 72 differs from that of voltage regulators 12 and 62.

Second amplifier 74 has its negative input connected to voltage 50, its positive input connected to the emitter of a third transistor 86, and its output connected to the base of third transistor 86. Since the inputs of second amplifier 74 are subject to a feedback loop, the emitter potential of third transistor 86 tends to be equal to the voltage of voltage 50. Second amplifier 74 and third transistor 86 are generating constant current $I_s$, wherein: $I_s = V/R_{s2}$.

The emitters of first and second output transistors 40 and 42 are connected to ground via terminal 48. The collector of second output transistor 42 is connected to second connecting point 44, and the collector of first output transistor 40 is connected to the negative input of amplifier 38 and to first connecting point 46. First resistor 52, of resistance $R_t$, is connected to the positive terminal of power source 30 and to second connecting point 44. Second resistor 54, of resistance $R_{s2}$, is connected between terminal 48 and terminal 84. Third resistor 88, of resistance $R_{s3}$ is connected between second connecting point 44 and terminal 82.

As shown in FIG. 3, the current flow from the stator coil of motor 16 into first connecting point 46 is designated $I_m$, the current flow into the collector of second output transistor 42 is designated $I_k$, and the current flow across second resistor 54 and third resistor 88 is designated $I_s$.

The positive input terminal of amplifier 38 is connected to the collector of third transistor 86 and to the output terminal 82. Voltage across the third resistor 88 is reference voltage $V_{ref}$, which operates as does $V_{ref}$ 50 in FIG. 1.

With reference to FIG. 3, the potential difference $V_{in}$ between the positive terminal of power source 30 and the positive input of error amplifier 38 is as follows:

$$V_{in} = V R_{s3}/R_{s2} + (I_k + I_s)R_t \quad (16)$$
$$= V(R_t/R_{s2} + R_{s3}/R_{s2}) + I_m R_t/K.$$

The first term to the right hand side of the equal sign in Equation 16 is a constant value while the second term is proportional to the current $I_m$ of motor 16. Also, the rotational speed N of motor 16 is determined by the following equation:

$$N = V(R_t/R_{s2} + R_{s3}/R_{s2})/K_a. \quad (17)$$

According to equation 17, the rotational speed of motor 16 is inversely proportional to the resistance of $R_{s2}$ of second resistor 54. Thus, if second resistor 54 is a negative-resistance temperature coefficient thermistor, the rotational speed of motor 16 will be a function of temperature as is the case with respect to the speed control systems 10 and 60.

The speed control system of the present invention maintains the speed of rotation of a DC brushless motor substantially constant with respect to load variations and/or supply voltage variations by controlling the current flowing through the motor stator coils. Thus, if there is a variation in the load and in the supply voltage to which the motor is subjected, the speed control system of the present invention will cause an appropriate variation in the current flow through the motor's stator coil and thereby compensate for the variation in motor load and supply voltage by maintaining the rotational speed of the motor substantially constant. Furthermore, if the second resistor 54 in each of the above described embodiments of the speed control system is replaced by a negative-resistance temperature coefficient thermistor, the rotational speed of the motor becomes a function of the ambient temperature surrounding second resistor 54. Thus, if the ambient temperature increases, the rotational speed of the fan will increase to provide additional air flow for additional cooling. In contrast, if there is a reduction in the ambient temperature, the rotational speed of the motor will decrease since less cooling is required, thereby resulting in quieter operation.

Although the present invention has been shown and described with respect to preferred embodiments, various changes and modifications which are obvious to persons skilled in the art to which the invention pertains are deemed to be within the spirit and scope of the invention. Thus, numerous changes and modifications can be made while staying within the scope of the invention which is set forth in the appended claims.

What is claimed is:

1. A high gain speed control voltage regulator for automatically controlling the rotational speed of a DC brushless motor in response to changes in load and temperature to provide a controlled motor speed which is independent of load and which varies directly with ambient temperature, said DC brushless motor having stator coils coupled to a power source at a first potential and a rotor, said voltage regulator coupled to said stator coils at a second potential and to said power source for regulating a stator voltage at said second potential of said stator coils, comprising:

a first input terminal coupled to receive power from a power source through a first resistor;

a second input terminal connected to receive said stator voltage;

a second resistance means, having a continuously varying variable resistance inversely related to the ambient temperature, connected between said first and said second input terminals;

a source of reference voltage;

an operational amplifier for comparing said reference voltage to said stator voltage, said operational amplifier having a positive terminal connected to said first input terminal, a negative terminal connected to said second input terminal and an operational amplifier output; and current mirror circuitry comprising first and second transistors coupled at respective first and second base terminals, said coupled base terminals being connected to said operational amplifier output, the emitters of said first and second transistors being connected to ground, the collector of said first transistor being connected to said first input terminal and the collector of said second transistor being connected to said second input terminal, whereby a change in said stator voltage produces a change in said operational amplifier output, thereby biasing said current mirror circuitry to increase or decrease current supplied to said motor in response to an increase or decrease in load, and thence proportionately to control the speed of said motor; and whereby an increase in the ambient temperature causes a resistance of said second resistance means to decrease, thereby increasing the current supplied to said motor to automatically increase the speed of said motor in response to said temperature increase.

2. The speed control voltage regulator in accordance with claim 1 further comprising:

a third input terminal coupled to said second resistance means opposite said second input terminal; and a third resistor connected between said first input terminal and said third input terminal.

3. A high gain speed control voltage regulator for automatically controlling the rotational speed of a DC brushless motor in response to changes in load and temperature to provide a controlled motor speed which is independent of load and which varies directly with ambient temperature, said DC brushless motor having stator coils coupled to a power source at a first potential and a rotor, said voltage regulator coupled to said stator coils at a second potential and to said power source for regulating a stator voltage at said second potential of said stator coils, comprising:

a first input terminal coupled to receive power from a power source through a first resistor connected between said first input terminal and said power source;

a second input terminal connected to receive said stator voltage;

a third input terminal;

a second resistor connected between said first and said third input terminals;

a fourth input terminal;

a fifth input terminal connected to ground;

a third resistance means having a continuously varying variable resistance inversely related to the ambient temperature, connected between said fourth and said fifth input terminals;

reference voltage circuitry for providing a reference voltage output, said circuitry comprising a voltage source, a first operational amplifier and a first transistor, said voltage source having an output connected to a negative terminal of said first operational amplifier, the positive terminal of said first operational amplifier being connected to said fourth input terminal, the base of said first transistor being coupled to a first operational amplifier output of said first operational amplifier, the collector of said first transistor further being connected to said third input terminal, and the emitter of said first transistor being connected to said fourth input terminal;

a second operational amplifier for receiving and comparing said reference voltage output to said stator voltage, and having a second operational amplifier output, said second operational amplifier having a positive terminal connected to said third input terminal, a negative terminal connected to said second input terminal;

current mirror circuitry comprising second and third transistors, the base terminals of said second and said third transistors being coupled to said second operational amplifier output, the emitters of said second and said third transistors being connected to said fifth input terminal, the collector of said second transistor being connected to said first input terminal, and the collector of said third transistor being connected to said second input terminal, whereby a change in said stator voltage produces a change in said second operational amplifier output thereby biasing said current mirror circuitry to increase or decrease current supplied to said motor in response to a corresponding increase or decrease in load, and thence proportionately to control the speed of said motor, and whereby an increase in the ambient temperature causes a resistance of said third resistor to decrease, thereby causing said current supplied to said motor to increase to automatically increase the speed of said motor in response to said temperature increase.

* * * * *